United States Patent
Todd et al.

(10) Patent No.: US 11,960,389 B2
(45) Date of Patent: Apr. 16, 2024

(54) COMPATIBILITY TESTING OF A COMPONENT WITH AN UNKNOWN SOFTWARE AND/OR FIRMWARE VERSION IN A MULTI-COMPONENT SYSTEM

(71) Applicant: International Business Machines Corporation, Armonk, NY (US)

(72) Inventors: Robert Lindsay Todd, Sand Lake, NY (US); Tram Thi Mai Nguyen, Santa Clara, CA (US); James Raimondo, Santa Clara, CA (US); Prasoon Sinha, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 17/515,037

(22) Filed: Oct. 29, 2021

(65) Prior Publication Data

US 2023/0136945 A1    May 4, 2023

(51) Int. Cl.
G06F 11/36    (2006.01)

(52) U.S. Cl.
CPC ...... *G06F 11/3688* (2013.01); *G06F 11/3692* (2013.01)

(58) Field of Classification Search
CPC ... G06F 11/36; G06F 11/3688; G06F 11/3692
See application file for complete search history.

(56) References Cited

U.S. PATENT DOCUMENTS

| | | | |
|---|---|---|---|
| 7,055,148 B2 | 5/2006 | Marsh et al. | |
| 7,337,311 B2 | 2/2008 | Chen et al. | |
| 8,607,040 B2 | 12/2013 | Zimmer et al. | |
| 8,677,343 B2 | 3/2014 | Averbuch et al. | |
| 8,898,722 B2 | 11/2014 | Reisman | |
| 8,924,950 B2 | 12/2014 | McDonald et al. | |

(Continued)

OTHER PUBLICATIONS

Geeks for Geeks, "Difference between Hardware and Software," GeeksforGeeks, Aug. 22, 2019, 8 pages, retrieved from https://www.geeksforgeeks.org/difference-between-hardware-and-software/.

*Primary Examiner* — Kamini B Patel
(74) *Attorney, Agent, or Firm* — Zilka-Kotab, P.C.

(57) ABSTRACT

A computer-implemented method according to one embodiment includes identifying, in a multi-component system, a first component with an unknown software version and/or unknown firmware version. A plurality of predetermined compatibility tests are implemented on the first component and results of the plurality of compatibility tests are recorded in a predetermined database of records shared amongst the multi-component system. A record associated with the first component indicates a compatibility of the unknown software version and/or unknown firmware version with the multi-component system. In response to a determination that the record indicates that the unknown software version and/or unknown firmware version is compatible with the multi-component system, data processing is performed between the first component and a second component. In response to a determination that the record indicates that the unknown software version and/or unknown firmware version is incompatible the multi-component system, a notification is issued that details the incompatibility.

18 Claims, 6 Drawing Sheets

(56) References Cited

U.S. PATENT DOCUMENTS

| | | | |
|---|---|---|---|
| 9,092,302 B2 | 7/2015 | Oberheide et al. | |
| 9,141,370 B1 * | 9/2015 | Nay | G06F 8/61 |
| 9,639,344 B2 | 5/2017 | Rockwell et al. | |
| 10,719,332 B1 * | 7/2020 | Dwivedi | G06F 8/65 |
| 10,754,638 B1 * | 8/2020 | Dwivedi | G06F 8/71 |
| 11,144,440 B1 * | 10/2021 | Daniali | G06F 11/3688 |
| 11,194,564 B1 * | 12/2021 | Dwivedi | H04L 67/10 |
| 11,256,497 B1 * | 2/2022 | Dwivedi | G06F 8/71 |
| 2009/0150408 A1 * | 6/2009 | Birkenfeld | B41F 33/0009 |
| 2012/0216183 A1 | 8/2012 | Mahajan et al. | |
| 2019/0354359 A1 * | 11/2019 | Olderdissen | G06F 8/654 |
| 2022/0019515 A1 * | 1/2022 | Daniali | G06F 11/3608 |

* cited by examiner

COMPATIBILITY TESTING OF A COMPONENT WITH AN UNKNOWN SOFTWARE AND/OR FIRMWARE VERSION IN A MULTI-COMPONENT SYSTEM

BACKGROUND

The present invention relates to multi-component systems, and more specifically, this invention relates to compatibility testing of a component with an unknown software and/or firmware version in a multi-component system.

System environments typically include a plurality of components such as a server, a client and storage nodes. There are also a plurality of components within each node that establish a multi-component system. For example, the components of a multi-component system may include, e.g., memory, a central processing unit (CPU), a drive, etc.

Each of the components of a multi-component system typically operate according to a software version and/or a firmware version. For example, a firmware version typically specifies one or more operational instructions of a software program run on a hardware component, while a software version typically includes one or more portions of computer code, e.g., program(s), procedure(s), data, instructions, etc., that when utilized, enable user interaction with a component. Components of a multi-component system typically operate compatibly with one another provided that the version of software and/or firmware that each of the components operate according to, are the same version.

SUMMARY

A computer-implemented method according to one embodiment includes identifying, in a multi-component system, a first component with an unknown software version and/or unknown firmware version. A plurality of predetermined compatibility tests are implemented on the first component and results of the plurality of compatibility tests are recorded in a predetermined database of records shared amongst the multi-component system. A record associated with the first component indicates a compatibility of the unknown software version and/or unknown firmware version with the multi-component system. In response to a determination that the record indicates that the unknown software version and/or unknown firmware version is compatible with the multi-component system, data processing is performed between the first component and a second component. In response to a determination that the record indicates that the unknown software version and/or unknown firmware version is incompatible the multi-component system, a notification is issued that details the incompatibility.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for compatibility testing of a component with an unknown software and/or firmware version in a multi-component system.

In one general embodiment, a computer-implemented method includes identifying, in a multi-component system, a first component with an unknown software version and/or unknown firmware version. A plurality of predetermined compatibility tests are implemented on the first component and results of the plurality of compatibility tests are recorded in a predetermined database of records shared amongst the multi-component system. A record associated with the first component indicates a compatibility of the unknown software version and/or unknown firmware version with the multi-component system. In response to a determination that the record indicates that the unknown software version and/or unknown firmware version is compatible with the multi-component system, data processing is performed between the first component and a second component. In response to a determination that the record indicates that the unknown software version and/or unknown firmware version is incompatible the multi-component system, a notification is issued that details the incompatibility.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Figure 1:
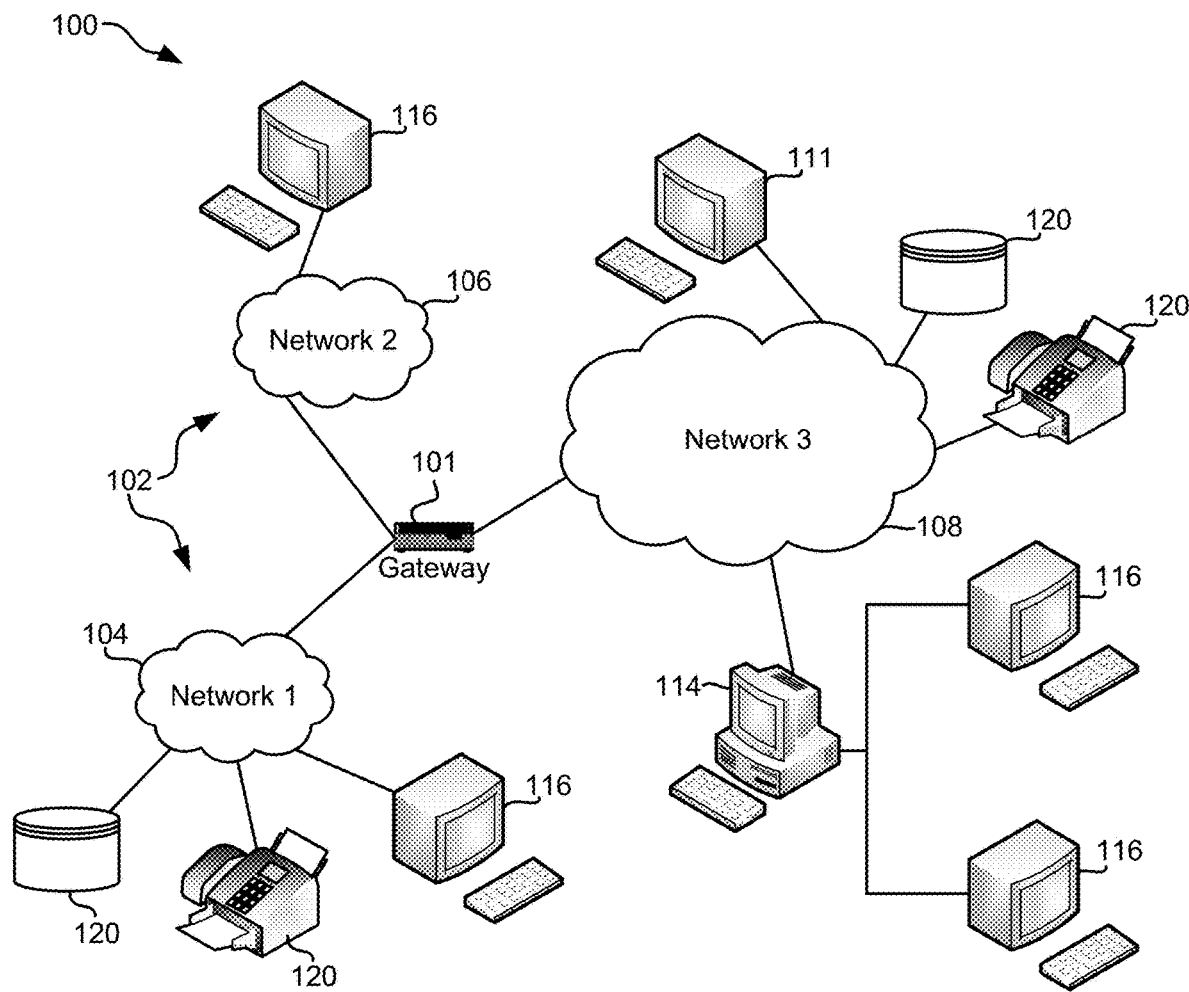
FIG. 1 is a diagram of a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
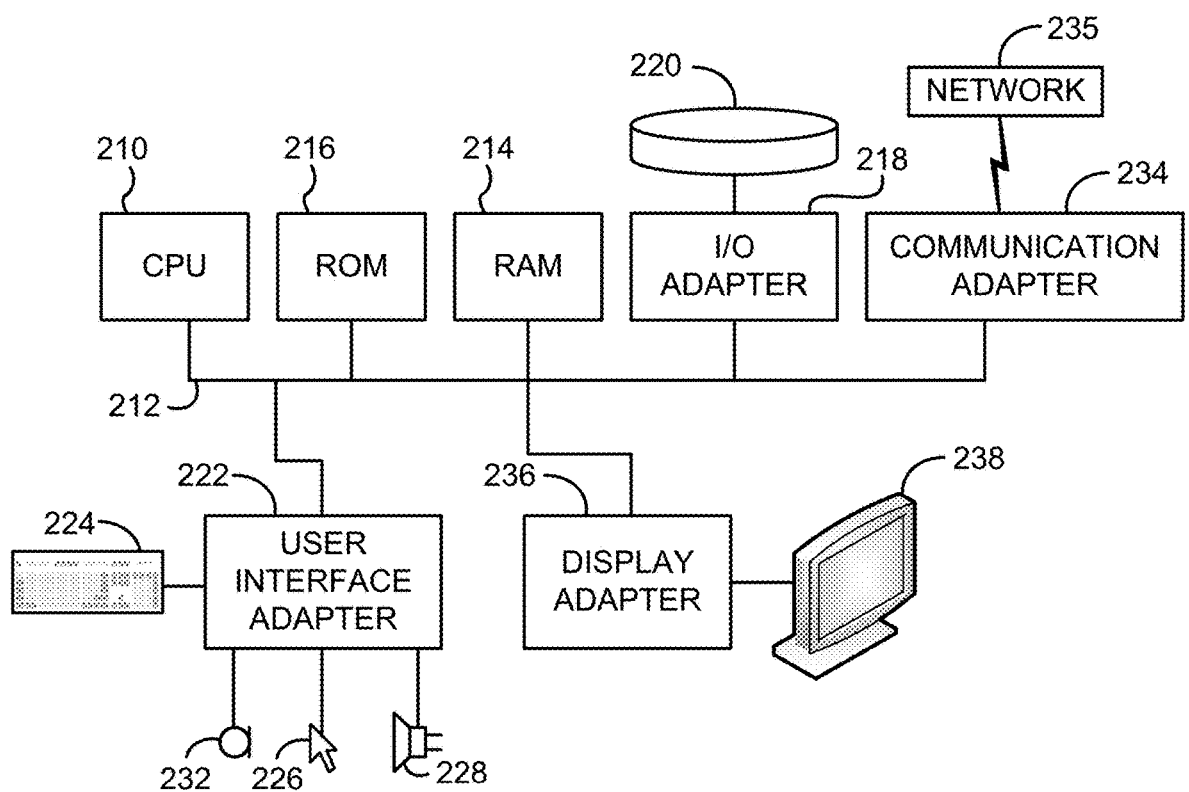
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
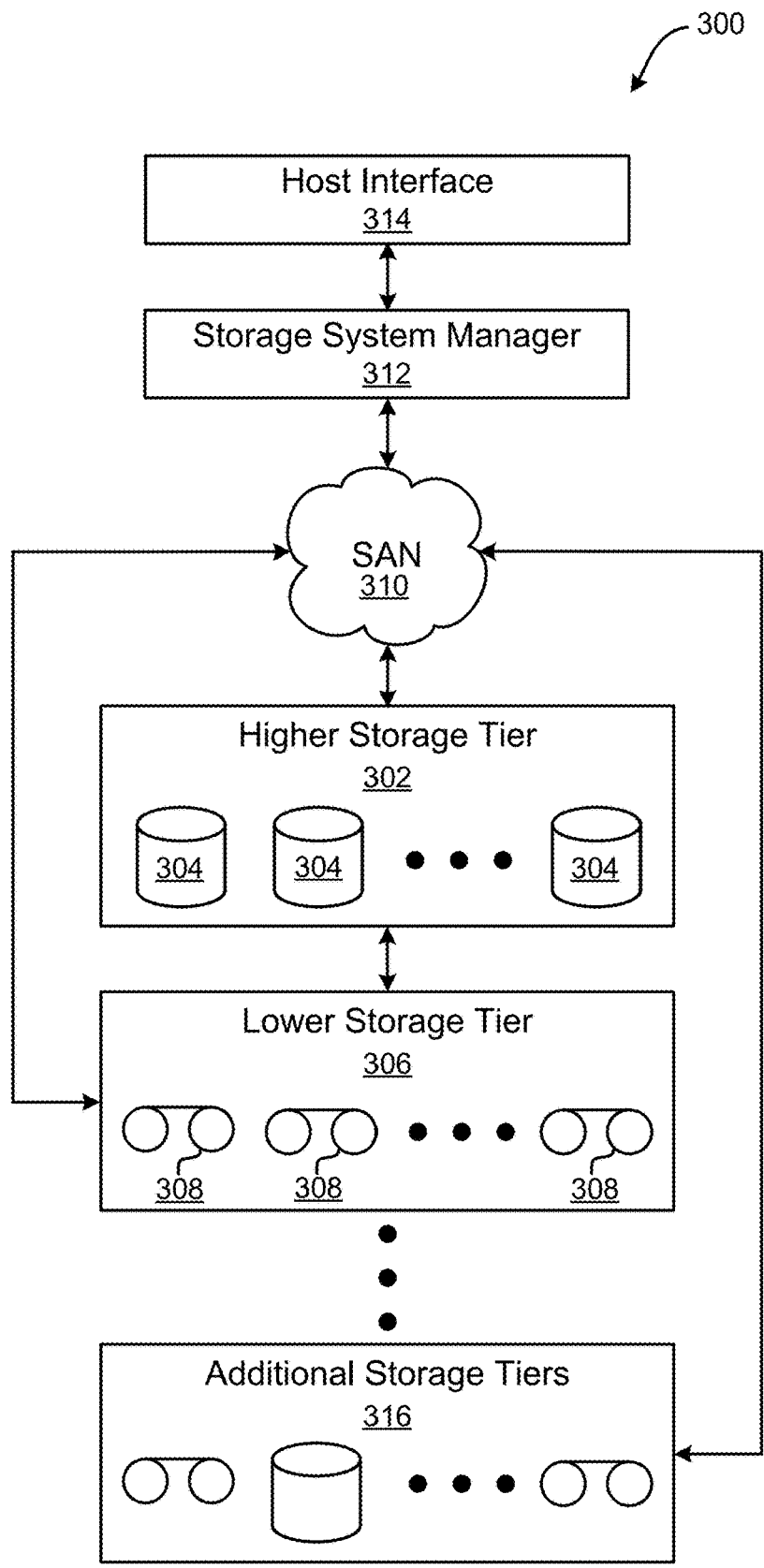
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere above, system environments typically include a plurality of components such as a server, a client and storage nodes. There are also a plurality of components within each node that establish a multi-component system. For example, the components of a multi-component system may include, e.g., memory, a central processing unit (CPU), a drive, etc.

Each of the components of a multi-component system typically operate according to a software version and/or a firmware version. For example, a firmware version typically specifies one or more operational instructions of a software program run on a hardware component, while a software version typically includes one or more portions of computer code, e.g., program(s), procedure(s), data, instructions, etc., that when utilized, enable user interaction with a component. Components of a multi-component system typically operate compatibly with one another provided that the version of software and/or firmware that each of the components operate according to, are versions designed to work together and validated by being tested together. However, one or more events may result in two or more components of a multi-component system having versions of software and/or firmware that are not compatible with one another. For example, versions of software and/or firmware of a first component of a multi-component system may transition from being compatible with other components of the multi-component system to being not compatible with the other components of the multi-component system as a result of an update being performed on the software version and/or firmware version of the first component, or replacement of failed components with new and/or used components.

For components of a multi-component system that use software and/or firmware, there is a considerable complexity involved in keeping track of which software and/or firmware version levels, e.g., hereafter "software and/or firmware versions," are compatible with each other. The degree of this complexity often depends on the number of components that the multi-component system includes, e.g., the greater the number of components, the more complex tracking the software and/or firmware version is. In the event that an unknown code level of a component, e.g., such as an unknown version of software, an unknown version of firmware, etc., is introduced in a multi-component system, the software of an interacting component must also be updated in order for the interacting component to recognize the unknown code level of the other component. If the software of an interacting component is not updated, errors are likely to occur in the multi-component system based on the software version of the interacting component and an unknown software and/or firmware version of the other component not being compatible. For example, these errors may include, e.g., a component of the multi-component system not performing a task that the component is instructed to perform, runtime errors, loss of functionality of the multi-component system, etc., which may require extensive debugging to identify the cause of and/or recover from.

In sharp contrast to the complex and error prone process described above for keeping track of software and/or firmware versions of components of a multi-component system, various embodiments and approaches described herein include techniques for automatically adapting components of a multi-component system to identify and interact with other components regardless of the software and/or firmware versions that the other component uses.

Figure 4:
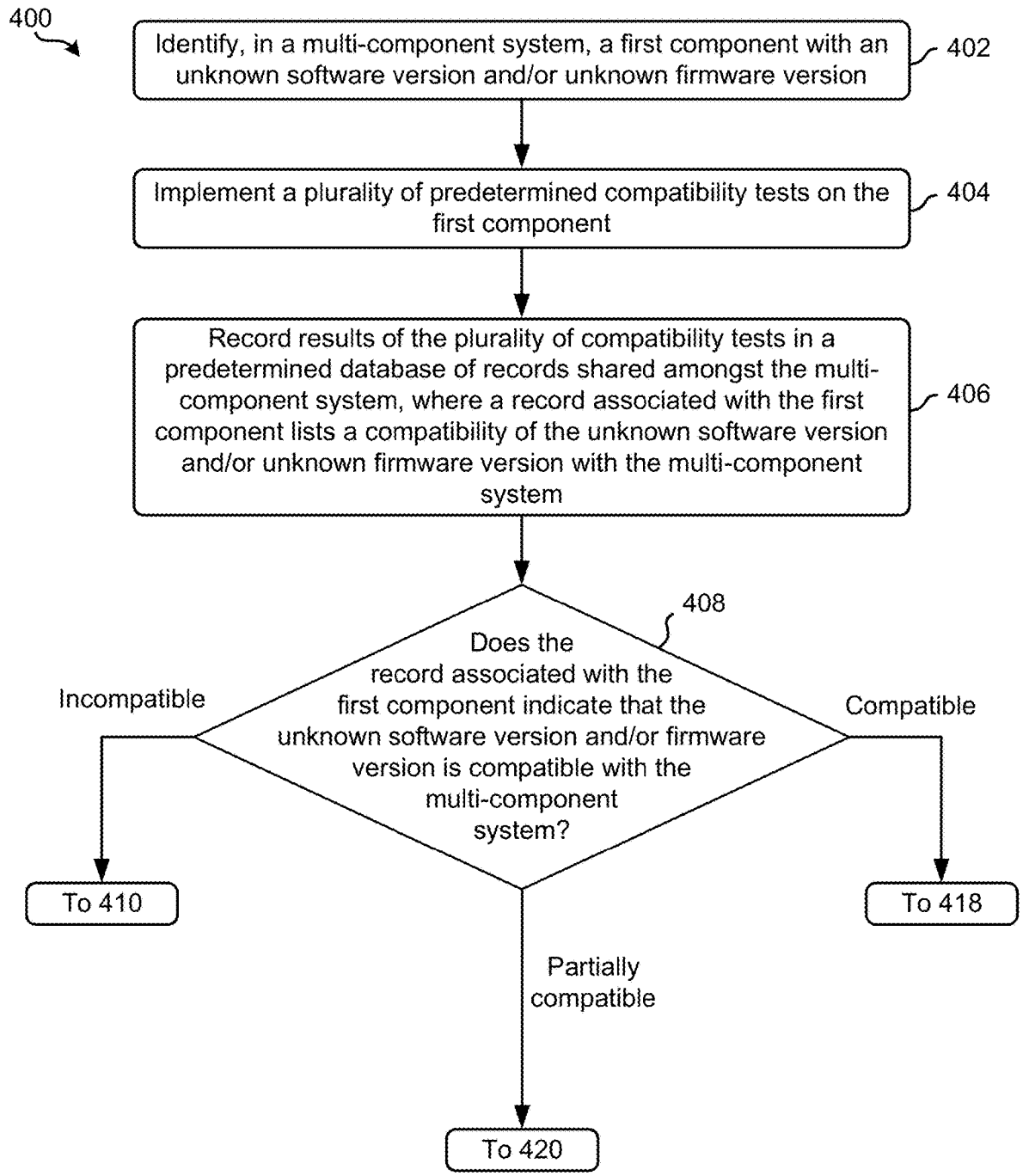
FIG. 4 is a flowchart of a method, in accordance with one embodiment.
Figure 4:
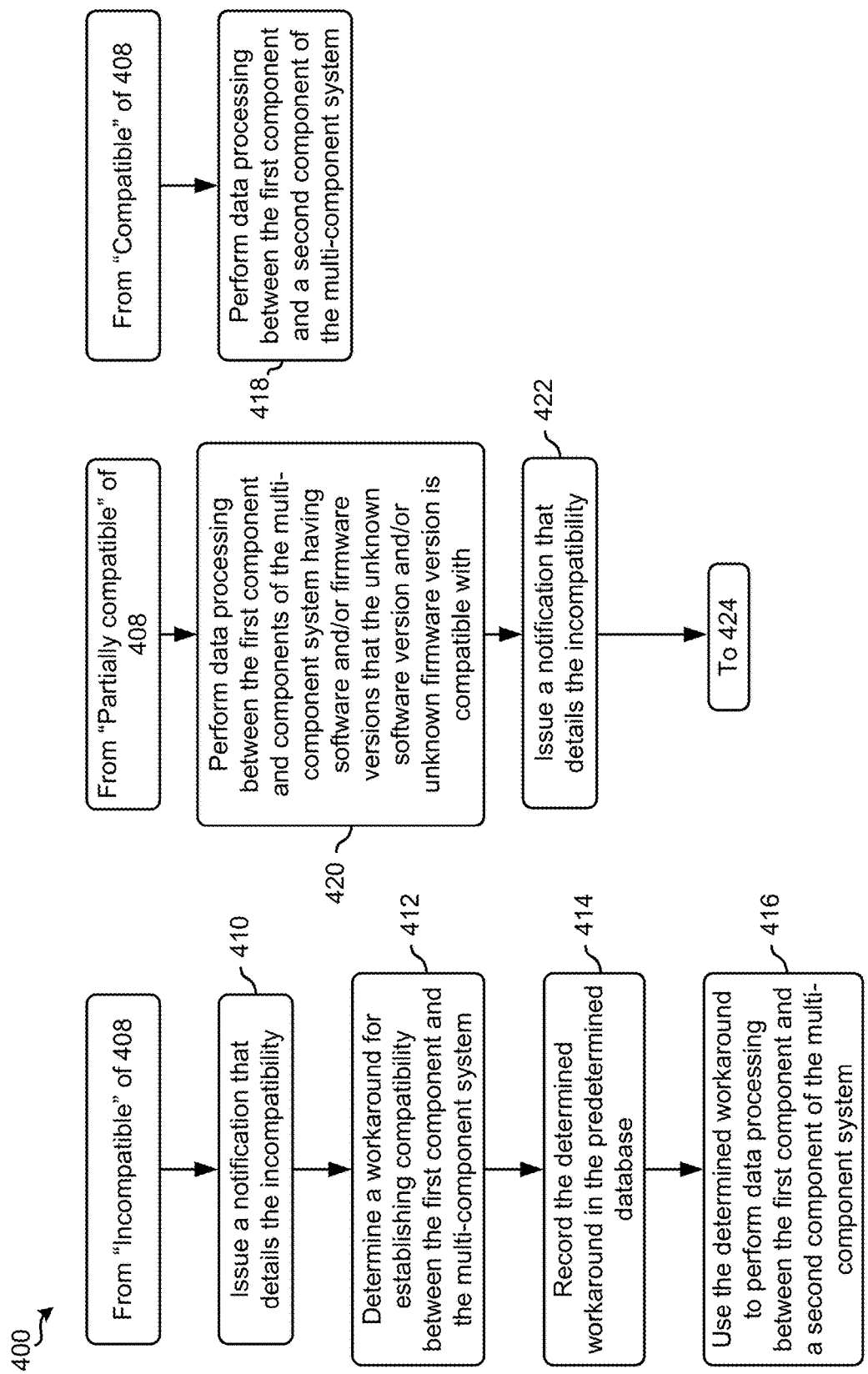
Figure 4:
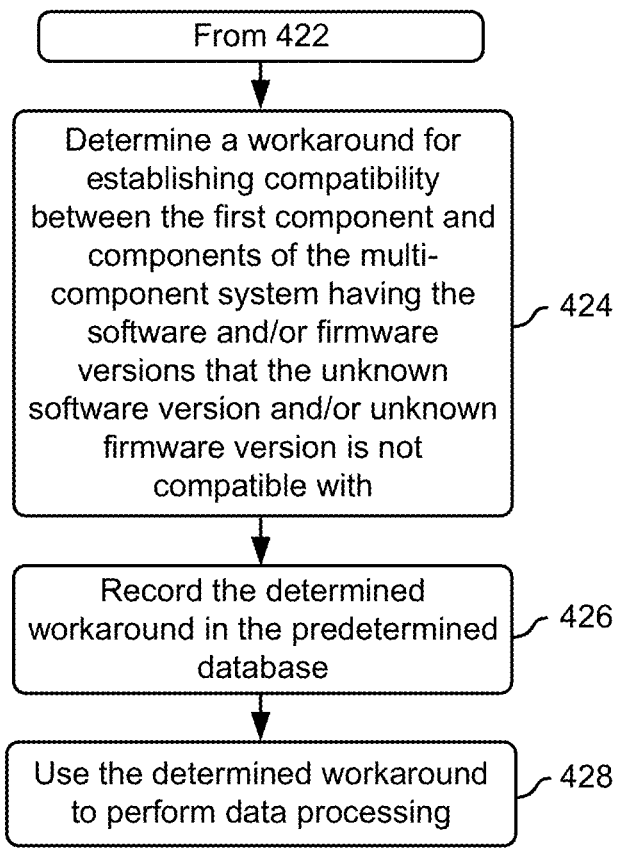

Now referring to FIG. 4, a flowchart of a method 400 is shown according to one embodiment. The method 400 may be performed in accordance with the present invention in any of the environments depicted in FIGS. 1-4, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that when writing portable software, one approach includes first identify an operating system (OS) and version, and then locking in the features that the OS and version are known to support. Another approach for writing portable software includes running feature tests on a new OS platform, and using features that are found to work. Various embodiments and approaches described herein include automatically adapting components of a multi-component system to identify and interact with another component regardless of the software and/or firmware version that the other component uses. These various embodiments and approaches extend to the notions of running feature tests in order to work with components having unknown software versions and/or unknown firmware versions. More specifically, in response to a component with a known software and/or firmware version being introduced to a multi-component system, the component may be directly supported. However, in response to a component with an unknown software and/or unknown firmware version being introduced to the multi-component system, one or more predetermined compatibility tests, e.g., such as a "health check" and/or other diagnostic tools, may be utilized to validate that the component (having the unknown software and/or unknown firmware version) can be used. The predetermined compatibility tests may additionally and/or alternatively be performed to determine features of the component with the unknown software and/or unknown firmware version. Internal tables of a predetermined database of records that detail what is supported in the multi-component system may be updated. This prevents the testing being called being repeated again upon another component, with the same previously unknown software version and/or firmware version, being introduced to the multi-component system. Discovered compatibility issues may also be noted in the tables, and recovery procedures may be carried out to isolate the unusable component. Depending on the approach, predetermined preferences may optionally be implemented with regards to whether to allow only components of known version levels to be included in data operations that are performed in a multi-component system, or alternatively whether to use the feature testing described above.

Operation 402 of method 400 includes identifying, in a multi-component system, a first component with an unknown software version and/or unknown firmware version. The multi-component system may include any number of components. Component of the multi-component system may of any known type of component, e.g., memory such as memory components in one or more storage tier(s), a CPU, a drive, a printer, a robotic accessor, a controller, a processor, a wireless component, etc. In some preferred approaches the multi-component system includes the first component and at least a second component that is configured to identify the first component. Accordingly, in some approaches, the first component is identified by the second component. In another approach, the multi-component system may include the second component and at least one additional component, while the identified first component may be requesting to connect to, and be a component of, the multi-component system. For example, the first component may be a pending component of the multi-component system. Accordingly, the first component may be identified in response to receiving a request from the first component, e.g., a request to connect to the multi-component system, a request to perform a data operation with a component of the multi-component system, a request to enter into a service state of the multi-component system, a request to initiate a handshake and/or data processing operation with one or more components of the multi-component system, etc. The first component may additionally and/or alternatively be identified by detecting the first component wirelessly and/or physically connect to one or more components of the multi-component system. In another approach, the first component may be an existing component of the multi-component system. For example, the first component may have previously performed data operations with one or more other components of the multi-component system. In this example, despite previously performing data operations with one or more other components of the multi-component system, the first component may have the unknown software version and/or unknown firmware version, e.g., as a result of an update being performed on the first component, as a result of failed components being replaced with new and/or used components. Accordingly, as a result of an update being performed on the first component, or alternatively, an update being performed on at least some components of the multi-component system other than the first component, data operations between the first component and other components of the multi-component system may be at least temporarily suspended. In another approach, as a result of the update being performed, the unknown software version and/or unknown firmware version used by the first component as a result of the update may be at least temporarily considered to be unknown, and as a result, subject to the compatibility testing described in various approaches herein.

In some approaches, the software version and/or firmware version of the first component may be unknown to, and therefore potentially incompatible with respect to, one or more different sub-portions of the multi-component system. For example, the software version and/or firmware version of the first component may be unknown and therefore potentially incompatible with a software version and/or a firmware version of the first component. In another example, the software version and/or firmware version of the first component may be unknown and therefore potentially incompatible with one or more software version(s) and/or one or more firmware version(s) that are predetermined to be compatible with components of the multi-component system, e.g., which may be stored as records of a predetermined database. Note that such a database will be described in greater detail elsewhere herein, e.g., see operation 406.

A plurality of predetermined compatibility tests may be implemented on the first component, e.g., see operation 404. The plurality of predetermined compatibility tests are performed for compatibility verification, e.g., a just-in-time inter-component software and/or firmware compatibility determination. Such compatibility verification is performed to ensure that the unknown software version and/or firmware version of the first component is not utilized in data processing between the first component and one or more other components of the multi-component system, where doing so would result in failure events based on the unknown software version and/or firmware version being incompatible with a software version and/or a firmware version of the other components.

In one preferred approach, at least some of the predetermined compatibility tests may be implemented on the first component by the second component. In another approach, at least some of the predetermined compatibility tests may be implemented on the first component by a third component of the multi-component system, e.g., which may be a processor and/or a controller that is configured to execute one or more operations of method 400 for managing compatibility between software version(s) and/or firmware version(s) of components of the multi-component system.

The predetermined compatibility tests may include regression tests, which may be of a known type. For example, where the first component is a drive, the predetermined compatibility tests may include performing one or more drive operations, e.g., such as sample read and/or write operations, gathering metrics associated with the operations performed such as Vital Product Data (VPD), loading the drive, etc. The predetermined compatibility tests may additionally and/or alternatively include a health check, e.g., such as a health check performed by instructing a health check application to perform a known type of health check. In some other approaches, in response to a determination that the first component includes different capabilities than an earlier component of the multi-component system, the health check may include some stress-testing operations beyond those performed in a typical health check, e.g., a relatively more rigorous series of testing operations. These additional stress-testing operations may be of a known type. According to various other approaches, the predetermined compatibility tests may additionally and/or alternatively include an inquiry of component information, health status, read and write setting such as cache enable, write and read blocks of data which may be erased after tests, etc. In response to a determination that the health check test fails, a local compatible software database may be updated with the results. Feedback may additionally and/or alternatively be sent back to a central location for future consideration.

In some approaches the predetermined compatibility tests may include a setting that only known software versions and/or firmware versions are to be accepted. In other words, in response to a determination that the first component uses an unknown software version and/or unknown firmware version, the results of the record associated with the first component preferably indicates that the unknown software version and/or unknown firmware version of the first component is incompatible with the multi-component system. In some other approaches, the predetermined compatibility tests may additionally and/or alternatively include a setting that allows anything that passes a health test verification to be accepted. In other words, in response to a determination that the unknown software version and/or unknown firmware version of the first component is compatible with the multi-component system, data processing may be performed between the first component and one or more other components of the multi-component system.

Implementation of the plurality of predetermined compatibility tests on the first component may in some approaches additionally and/or alternatively include performing one or more data operations, or alternatively one or more data sub-operations, between two or more components of the multi-component system. Note that these data operations and/or data sub-operations may be of a known type. In other approaches, implementation of the plurality of predetermined compatibility tests on the first component may additionally and/or alternatively include using known estimation techniques to determine whether data operations between two components would be successful if actually performed. In some additional approaches, implementation of the plurality of predetermined compatibility tests on the first component may additionally and/or alternatively include determining one or more known type of characteristics from the unknown software version and/or unknown firmware version of the first component. The determined characteristics may be compared with characteristics of a predetermined record that lists various characteristics that are predetermined to be compatible the multi-component system. In response to a determination that a predetermined number of the determined characteristics are listed in the record, it may be determined that the unknown software version and/or unknown firmware version is compatible with the multi-component system. In contrast, in response to a determination that a predetermined number of the determined characteristics are not listed in the record, it may be determined that the unknown software version and/or unknown firmware version is incompatible with the multi-component system.

As a result of implementing the plurality of predetermined compatibility tests on the first component, results of the plurality of compatibility tests may be generated. In some preferred approaches, the results of the plurality of compatibility tests detail whether the unknown software version and/or unknown firmware version is compatible with the multi-component system. It should be noted that a degree that the unknown software version and/or unknown firmware version is compatible or alternatively incompatible with the multi-component system may depend on the approach. For example, in some approaches the unknown software version and/or unknown firmware version may be completely compatible with the multi-component system, e.g., the unknown software version and/or unknown firmware version of the first component is compatible with software versions and/or firmware versions of all other components of the multi-component system. In some alternative approaches, the unknown software version and/or unknown firmware version may be completely incompatible with the multi-component system, e.g., the unknown software version and/or unknown firmware version of the first component is incompatible with software versions and/or firmware versions of all other components of the multi-component system. In further alternative approaches, the unknown software version and/or unknown firmware version may be partially compatible with the multi-component system and partially incompatible with the multi-component system, e.g., the unknown software version and/or unknown firmware version is compatible with a first portion of the components of the multi-component system and the unknown software version and/or unknown firmware version is incompatible with a second portion of the components of the multi-component system.

Operation 406 of method 400 includes recording results of the plurality of compatibility tests in a predetermined database of records. The predetermined database may be a compatible software database of a known type. In some approaches the predetermined database is located on at least one component of the multi-component system. The predetermined database may additionally and/or alternatively be located on more than one storage tier of the multi-component system in some approaches, e.g., see FIG. 3. The database and records of the database may be shared amongst the multi-component system, e.g., such that one or more components of the multi-component system are configured to access records of the database. In some preferred approaches, at least some of the records of the database indicate compatibility of an associated one of the components of the multi-component system. For example, in one approach, a record associated with the first component indicates a compatibility, e.g., compatible, incompatible, partially compatible, etc., of the unknown software version and/or unknown firmware version with the multi-component system. In some preferred approaches, this compatibility is determined based on the results of the plurality of implemented compatibility tests, e.g., see operation 404. For example, in some approaches, it may be determined, e.g., from the results of the predetermined compatibility tests, that the unknown software version and/or firmware version of the first component is compatible with the multi-component system in response to a determination that at least a predetermined number of the compatibility tests are successfully performed, e.g., whether a heath check failed or succeeded. In response to such a determination, the record associated with the first component may be generated or alternatively modified to indicate the determined compatibility. In contrast, in response to a determination, e.g., from the results of the predetermined compatibility tests, that at least the predetermined number of the compatibility tests are not successfully performed, the record associated with the first component may be generated or alternatively modified to indicate an incompatibility of the unknown software version and/or unknown firmware version of the first component with the multi-component system. In some other approaches, it may be determined, e.g., from the results of the predetermined compatibility tests, that the unknown software version and/or firmware version of the first component is compatible with the multi-component system in response to a determination that results of the known estimation techniques (described elsewhere herein to be used to determine whether data operations between two or more components would be successful if actually performed) indicate that data operations between the two or more components would be successful. In response to such a determination, the record associated with the first component may be generated or alternatively modified to indicate the determined compatibility. In contrast, in response to a determination, e.g., from the results of the predetermined compatibility tests, that results of the known estimation techniques indicate that data operations between the two or more components would not be successful, the record associated with the first component may be generated or alternatively modified to indicate an incompatibility of the unknown software version and/or unknown firmware version of the first component with the multi-component system. In some other approaches, it may be determined, e.g., from the results of the predetermined compatibility tests, that the unknown software version and/or firmware version of the first component is compatible with the multi-component system in response to a determination that at least a predetermined number of characteristics determined from the unknown software version and/or unknown firmware version of the first component are listed in a predetermined record. In response to such a determination, the record associated with the first component may be generated or alternatively modified to indicate the determined compatibility. In contrast, in response to a determination, e.g., from the results of the predetermined compatibility tests, that at least the predetermined number of characteristics determined from the unknown software version and/or unknown firmware version of the first component are not listed in the predetermined record, it may be determined that the unknown software version and/or unknown firmware version is not compatible with the multi-component system, and the record associated with the first component may be generated or alternatively modified to indicate the determined. In yet some other approaches, known techniques may additionally and/or alternatively be used to determine whether a compatibility exists between the unknown software version and/or unknown firmware version and the multi-component system, based on the results of the predetermined compatibility tests.

Feedback, e.g., such as the results of the plurality of compatibility tests, may additionally and/or alternatively be output to a predetermined central location for future consideration in some approaches. For example, such feedback may be output to, e.g., an administrator of a component customer account, a device of a manager of the multi-component system, an application, etc. This feedback may be used to generate an update, e.g., such as a patch, that establishes compatibility between the software and/or firmware of each of the components of the multi-component system.

Prior to allowing data operations to be performed between the first component and components of the multi-component system, e.g., such as the second component, method 400 preferably includes determining whether the unknown software version and/or unknown firmware version of the first component is compatible with the multi-component system. Accordingly, decision 408 of method 400 includes determining whether the record associated with the first component indicate that the unknown software version and/or firmware version is compatible with the multi-component system. In some approaches it is determined that the record indicates that the unknown software version and/or unknown firmware version is compatible with the multi-component system, e.g., as illustrated by the "Compatible" logical path of decision 408. In response to a determination that the record indicates that the unknown software version and/or unknown firmware version is compatible with the multi-component system, data processing may be performed between the first component and one or more other components of the multi-component system. For example, data processing may be performed between the first component and the second component, e.g., see operation 418. The data processing may be of a known type. In some approaches, method 400 optionally includes verifying whether data processing between the first component and one or more other components of the multi-component system are successfully performed. This verification may serve as a verification of the determination that the unknown software version and/or unknown firmware version is compatible with the multi-component system, e.g., an additional extent of compatibility than that achieved as a result of performing the plurality of predetermined compatibility tests on the first component. Results of the verification may in some approaches be stored on the record associated with the first component.

It should be noted that the record associated with the first component may thereafter be used to determine whether another identified component, that has the same unknown software version and/or firmware version as the first component, is compatible with the multi-component system. Note that such a determination is therefore performed by simply accessing the record associated with the first component rather than performing the plurality of predetermined compatibility tests again. The access may in some approaches be performed in response to a determination that a component with an unknown software and/or firmware version is connected to a multi-component system. This results in processing potential being conserved in the multi-component system.

In some approaches it is determined that the record indicates that the unknown software version and/or unknown firmware version is incompatible with the multi-component system, e.g., as illustrated by the "Incompatible" logical path of decision 408. In response to a determination that the record indicates that the unknown software version and/or unknown firmware version is incompatible with the multi-component system, a notification that details the incompatibility may be generated and/or issued, e.g., see operation 410. The notification may include one or more types of information that detail the incompatibility, e.g., such as identifying information of the first component, identifying information of the second component, the unknown software version and/or unknown firmware version, the results of the plurality of compatibility tests, etc.

In some approaches the notification is output to an administrator of the multi-component system. In some other approaches the notification may additionally and/or alternatively be output to a display device. In some other approaches the notification may additionally and/or alternatively be output as part of a recovery procedure. For example, the notification may be output to a database having logic that is configured to determine a workaround patch for establishing compatibility between the first component and the multi-component system. In such approaches, a workaround may be received from the database and recorded in the predetermined database. A workaround for establishing compatibility between the first component and the multi-component system may additionally and/or alternatively be input manually, e.g., using one of the components of the multi-component system. Workarounds may optionally be verified using known techniques before being accepting temporarily or permanently in the multi-component system. For example, the workaround may be utilized on only a predetermined subset of the components of the multi-component system initially, e.g., a predetermined subset of the components that are not compatible with the unknown software version and/or unknown firmware version of the first component. It may be verified, e.g., using known techniques, whether the workaround is successfully used to establish compatibility with the first component and the predetermined subset of the components. In response to a determination that the workaround is successfully used to establish compatibility with the first component and the predetermined subset of the components, the workaround may optionally be used on one or more other components of the multi-component to establish compatibility with the first component and the one or more other components. A workaround for establishing compatibility between the first component and the multi-component system may additionally and/or alternatively be determined in response to a determination that the record indicates that the unknown software version and/or unknown firmware version is incompatible the multi-component system, e.g., see operation 412. In some approaches, the workaround may be of a known type and/or of a predetermined process, e.g., resetting one or more components of the multi-component system. In another approach, the workaround may include a patch that establishes compatibility between the first component and the multi-component system. The workaround may be determined using results of the plurality of compatibility tests. For example, in some approaches, a patch may be generated, e.g., using known techniques for generating a patch, that is configured to mitigate incompatibilities noted in the record associated with the first component. The patch may be configured to, during execution, establish compatibility between the first component and at least a second component of the multi-component system when performing data processing between the first component and the second component thereafter. In some other approaches, the patch may identify data processing operations that are not able to be performed between the first component and other component(s) of the multi-component system as a result of the incompatibility and/or data operations that are able to be performed between the first component and other component(s) of the multi-component system as a result of the incompatibility. In such approaches the patch may be used to avoid performing data processing operations that would likely fail.

The determined workaround and/or the received workaround may be recorded in the predetermined database, e.g., see operation 414. Operation 416 incudes using the workaround to perform data processing between the first component and the second component.

It should be noted that in some approaches, workarounds and/or the results of the plurality of compatibility tests may be recorded in the predetermined database of records dynamically. For example, the method may optionally include dynamically updating the predetermined database with the results of the plurality of compatibility tests and/or workarounds.

Note that, as part of a recovery procedure, data operations associated with the first component may be at least temporarily suspended in response to a determination that the unknown software version and/or unknown firmware version of the first component is incompatible with the multi-component system, e.g., thereby isolating the unstable component. For example, the first component may be powered-down during the recovery procedure in order to prevent the incompatible unknown software version and/or unknown firmware version from causing an error event in the multi-component system. In some approaches, more than the first component may be powered-down during the recovery procedure. For example, where the first component is located in an enclosure with a second component and a third component, one or more of the first component, the second component and the third component may be powered down as part of the recovery procedure. Data operations associated with the first component may optionally resume and/or be performed in response to a workaround being established.

In some approaches, a notification may additionally and/or alternatively be issued in order to maintain compatible versions of software and/or firmware amongst components of the multi-component system. More specifically, in some approaches, prioritized components of the multi-component system may be ensured to be compatible with other components, such as the first component, as a result of notifications being issued. For example, a notification may be output to a device used by an administrator a component of the multi-component system. The notification may inform the administrator that a prioritized component is due for updating in order for the component remain compatible with one or more other components of the multi-component system. In such approaches, assignments may be received, e.g., user assignments, that specify a priority of compatibility of components. This priority may be used as part of a system profile to track current software and/or hardware versions of different components within the multi-component system. The most critical components, e.g., components with at least a predetermined degree of priority, may be flagged for the need of a compatibility notification in response to a determination that the prioritized component is not compatible with a version of software and/or firmware of another component, e.g., such as the unknown software version and/or unknown firmware version of the first component. According to a more specific example, a notification may be issued to specific vendors of a prioritized component on a new "Need for Compatibility" requirement in order to ensure compatibility between the prioritized component and at least one other component of the multi-component system. This notification scheme may be output to a dashboard used by the vendors to track and prioritize the new requirements based upon a percentage of matching requests across all systems.

In an illustrative approach, for ensuring that prioritized components of the multi-component system are compatible with other components as a result of notifications being issued, an optional operation of method 400 includes receiving priority information. The priority information preferably specifies a priority of capabilities of components of the multi-component system. In some approaches, the priority information may be recorded to records of a database. Current software and/or firmware of the prioritized components of the multi-component system may be tracked, e.g., as components are connected to the multi-component system, as components are disconnected from the multi-component system, as updates are performed on software and/or firmware of one or more components of the multi-component system, etc. This tracking may be performed in order to determine whether the prioritized component satisfies a capability specified in the received priority information. For example, it may be determined that a third component of the multi-component system does not satisfy an associated priority of capabilities of the third component. Such a determination may be based on whether a prioritized component is compatible with a predetermined software and/or firmware version of another component, e.g., such as a component with an unknown software and/or firmware version which may attempt to perform data processing operations with the prioritized component. For example, assuming that a third component of the multi-component system is a prioritized component, it may be determined that a third component of the multi-component system does not satisfy an associated priority of capabilities of the third component in response to a determination that the third component is not compatible with the unknown software version and/or unknown firmware version of the first component. A notification to update capabilities of the third component may be issued, e.g., to an administrator from which the prioritizing information is received, in response to the determination that the third component of the multi-component system does not satisfy the associated priority of capabilities of the third component. In contrast, in response to a determination that the third component of the multi-component system satisfies the associated priority of capabilities of the third component, the third component may not be updated, and may continue to operate with a current software and/or firmware version.

With reference again to decision 408, in some approaches it is determined that the record indicates that the unknown software version and/or unknown firmware version is partially compatible with the multi-component system, e.g., as illustrated by the "Partially Compatible" logical path of decision 408. More specifically, in some approaches it may be determined that the record indicates that the unknown software version and/or unknown firmware version is compatible with software and/or firmware versions of a first portion of the components of the multi-component system and is incompatible with software and/or firmware versions of a second portion of the components of the multi-component system. In response to a determination that the record indicates that the unknown software version and/or unknown firmware version is compatible with the software and/or firmware versions of a first portion of the components of the multi-component system and is incompatible with the software and/or firmware versions of a second portion of the components of the multi-component system, data processing may be performed between the first component and the first portion of the components, e.g., see operation 420. A notification that details the incompatibility may additionally and/or alternatively be issued, e.g., see operation 422. Such a notification may include similar types of information and/or have similar output destinations as the notifications described elsewhere herein, e.g., see operation 410. Furthermore, in some approaches, in response the determination that the record indicates that the unknown software version and/or unknown firmware version is compatible with the software and/or firmware versions of the first portion of the components of the multi-component system and is incompatible with the software and/or firmware versions of the second portion of the components of the multi-component system, method 400 may include at least temporarily not performing and/or not allowing data processing between the first component and the second portion of the components. Data processing between the first component and the second portion of the components is in some approaches not performed and/or not allowed at least until a workaround is determined that may be used to establish compatibility between the unknown software version and/or firmware version of the first component and components of the multi-component system having software version and/or firmware versions that the unknown software and/or unknown firmware version is not compatible with. This may include the software and/or firmware versions of the second portion of the components, e.g., see operation 424. Such a workaround may be generated using similar techniques to those described elsewhere herein and/or be of a similar type to those described elsewhere herein, e.g., see operation 412.

The determined workaround may be recorded in the predetermined database, e.g., see operation 426. The determined workaround may additionally and/or alternatively be used to perform data processing between the first component and components of the multi-component system having software and/or firmware versions that are not compatible with the unknown software version and/or unknown firmware version, e.g., see operation 428.

As the compatibility status of additional hardware components becomes known, e.g., as a result of using various techniques described herein, future code releases of the multi-component system may include changes/improvements that facilitate compatibility among components of a multi-component system. For example, during development of future code releases, the records of the shared database may be considered to ensure that a code release does not create an incompatibility between software and/or firmware versions of two or more components of the multi-component system. As a result, development of a future code release advantageously uses available data rather than incompatibilities being otherwise determined as a result of additional testing and/or troubleshooting after the code is loaded in the multi-component system. Moreover, the centralized database may receive notification of which customer(s) have encountered previous issues. As a result, upon a change being released, e.g., such as a software and/or firmware update, customer devices may be selectively notified, rather than a global notification being output which may not otherwise document such a change.

There are various benefits enabled as a result of utilizing the techniques described herein for determining whether the software and/or firmware of an identified component in a multi-component system is compatible with software and/or firmware versions of other components of the multi-component system. This is at least in part because ensuring that unknown software version and/or firmware version used by a first component is compatible with software version(s) and/or firmware version(s) of other components of the multi-component system before performing data processing between the first component and the other components prevents failure events that would likely otherwise occur in the event that incompatible software versions and/or firmware versions were used in such data processing. Accordingly, the techniques described herein result in multi-component system efficiencies as the performance of data processing operations in a multi-component system is maintained. These benefits are further experienced as a result of utilizing the techniques described herein for maintaining and utilizing a predetermined database of records shared amongst components of the multi-component system, where records associated with identified components list whether software and/or firmware of the identified components is compatible with the multi-component system. This is because records of the maintained database may thereafter be used to perform one or more compatibility determinations, as opposed to having to perform such compatibility testing each time that a component having a software and/or firmware version that was previously tested is identified in the multi-component system. Such compatibility testing and recording of compatibility records has heretofore not been considered in multi-component system. In sharp contrast, presence of an unknown software version and/or firmware version in conventional multi-component systems frequently leads to either failure events and/or a postponement of data processing operations that involve components having an unknown software version and/or firmware version. Accordingly, the inventive discoveries disclosed herein with regards to compatibility testing and the recording and reference of compatibility records proceed contrary to conventional wisdom.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
identifying, in a multi-component system, a first component with an unknown software version and/or unknown firmware version;
implementing a plurality of predetermined compatibility tests on the first component;
recording results of the plurality of compatibility tests in a predetermined database of records shared amongst the multi-component system;
in response to a determination that a first of the records indicates that the unknown software version and/or unknown firmware version is compatible with the multi-component system, performing data processing between the first component and a second component;
receiving priority information that specifies a priority of capabilities of components of the multi-component system; and
issuing a notification to update capabilities of a third component of the multi-component system in response to a determination that the third component does not satisfy an associated priority of capabilities of the third component.

2. The computer-implemented method of claim 1, wherein the predetermined compatibility tests include regression tests.

3. The computer-implemented method of claim 1, wherein the predetermined compatibility tests include a health check.

4. The computer-implemented method of claim 1, wherein the first record is associated with the first component and indicates a compatibility of the unknown software version and/or unknown firmware version with the multi-component system, and comprising: in response to a determination that the first record indicates that the unknown software version and/or unknown firmware version is compatible with software and/or firmware versions of a first portion of the components of the multi-component system and is incompatible with software and/or firmware versions of a second portion of the components of the multi-component system, performing data processing between the first component and the first portion of the components.

5. The computer-implemented method of claim 4, comprising: determining a workaround for establishing compatibility between the first component and the second portion of the components; and using the workaround to perform data processing between the first component and the second portion of the components.

6. The computer-implemented method of claim 1, comprising: in response to a determination that the first record indicates that the unknown software version and/or unknown firmware version is incompatible the multi-component system: issuing a notification that details the incompatibility; determining a workaround for establishing compatibility between the first component and the multi-component system; storing the workaround in the predetermined database; and using the workaround to perform data processing between the first component and the second component.

7. The computer-implemented method of claim 1, wherein the first component is identified by the second component, wherein the plurality of predetermined compatibility tests are implemented on the first component by the second component.

8. A computer program product, the computer program product comprising a computer readable storage medium having program instructions embodied therewith, the program instructions readable and/or executable by a computer to cause the computer to:

cause, by the computer, a second component to implement a plurality of predetermined compatibility tests on a first component with an unknown software version and/or unknown firmware version, wherein the first component is identified by the second component in a multi-component system;

record, by the computer, results of the plurality of compatibility tests in a predetermined database of records shared amongst the multi-component system, wherein a record associated with the first component indicates a compatibility of the unknown software version and/or unknown firmware version with the multi-component system;

in response to a determination that the record indicates that the unknown software version and/or unknown firmware version is compatible with the multi-component system, perform, by the computer, data processing between the first component and a second component; and in response to a determination that the record indicates that the unknown software version and/or unknown firmware version is incompatible the multi-component system, issue, by the computer, a notification that details the incompatibility.

9. The computer program product of claim 8, wherein the predetermined compatibility tests include regression tests.

10. The computer program product of claim 8, wherein the predetermined compatibility tests include a health check.

11. The computer program product of claim 8, the program instructions readable and/or executable by the computer to cause the computer to: in response to a determination that the record indicates that the unknown software version and/or unknown firmware version is compatible with software and/or firmware versions of a first portion of the components of the multi-component system and is incompatible with software and/or firmware versions of a second portion of the components of the multi-component system, perform, by the computer, data processing between the first component and the first portion of the components.

12. The computer program product of claim 11, the program instructions readable and/or executable by the computer to cause the computer to: determine, by the computer, a workaround for establishing compatibility between the first component and the second portion of the components; and using the workaround to perform data processing between the first component and the second portion of the components.

13. The computer program product of claim 8, the program instructions readable and/or executable by the computer to cause the computer to: in response to a determination that the record indicates that the unknown software version and/or unknown firmware version is incompatible the multi-component system, determine, by the computer, a workaround for establishing compatibility between the first component and the multi-component system; store, by the computer, the workaround in the predetermined database; and use, by the computer, the workaround to perform data processing between the first component and the second component.

14. The computer program product of claim 8, the program instructions readable and/or executable by the computer to cause the computer to: receive, by the computer, priority information that specifies a priority of capabilities of components of the multi-component system; recording the priority information to the record; determine, by the computer, that a third component of the multi-component system does not satisfy an associated priority of capabilities of the third component; and issue, by the computer, a notification to update capabilities of the third component in response to the determination that the third component of the multi-component system does not satisfy the associated priority of capabilities of the third component.

15. A system, comprising:
a processor; and
logic integrated with the processor, executable by the processor, or integrated with and executable by the processor, the logic being configured to:
identify, in a multi-component system, a first component with an unknown software version and/or unknown firmware version;
implement a plurality of predetermined compatibility tests on the first component;
record results of the plurality of compatibility tests in a predetermined database of records shared amongst the multi-component system, wherein a record associated with the first component indicates a compatibility of the unknown software version and/or unknown firmware version with the multi-component system;
in response to a determination that the record indicates that the unknown software version and/or unknown firmware version is compatible with the multi-component system, perform data processing between the first component and a second component;
in response to a determination that the record indicates that the unknown software version and/or unknown firmware version is incompatible the multi-component system, issue a notification that details the incompatibility;
receive priority information that specifies a priority of capabilities of components of the multi-component system;
record the priority information to the record;
determine that a third component of the multi-component system does not satisfy an associated priority of capabilities of the third component; and
issue a notification to update capabilities of the third component in response to the determination that the third component of the multi-component system does not satisfy the associated priority of capabilities of the third component.

16. The system of claim 15, wherein the predetermined compatibility tests include regression tests.

17. The system of claim 15, wherein the predetermined compatibility tests include a health check.

18. The system of claim 15, the logic being configured to: in response to a determination that the record indicates that the unknown software version and/or unknown firmware version is compatible with a first portion of the components of the multi-component system and is incompatible with a second portion of the components of the multi-component system, perform data processing between the first component and the first portion of the components.

* * * * *